(12) United States Patent
Wang et al.

(10) Patent No.: US 11,006,464 B2
(45) Date of Patent: May 11, 2021

(54) METHOD, APPARATUS, STORAGE MEDIUM, AND TERMINAL FOR ESTABLISHING A WI-FI CONNECTION

(71) Applicant: Shanghai Xiaoyi Technology Co., Ltd., Shanghai (CN)

(72) Inventors: Tao Wang, Beijing (CN); Shuangquan Hou, Beijing (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 29 days.

(21) Appl. No.: 16/041,896

(22) Filed: Jul. 23, 2018

(65) Prior Publication Data

US 2019/0037614 A1 Jan. 31, 2019

(30) Foreign Application Priority Data

Jul. 25, 2017 (CN) .......................... 201710611466.9

(51) Int. Cl.
*H04W 4/80* (2018.01)
*H04W 48/14* (2009.01)
(Continued)

(52) U.S. Cl.
CPC ............. *H04W 76/10* (2018.02); *H04W 4/80* (2018.02); *H04W 8/24* (2013.01); *H04W 48/14* (2013.01)

(58) Field of Classification Search
None
See application file for complete search history.

(56) References Cited

U.S. PATENT DOCUMENTS 9,094,052 B1 7/2015 Hsu et al.
2011/0320535 A1* 12/2011 Donaldson .......... H04W 12/003
709/204
(Continued)

FOREIGN PATENT DOCUMENTS

CN 101998695 A 3/2011
CN 105188013 A 12/2015
(Continued)

OTHER PUBLICATIONS

Extended European Search Report issued by the European Patent Office in counterpart European Patent Application No. 18185077.7 dated Dec. 12, 2018.
(Continued)

*Primary Examiner* — Duc T Duong
(74) *Attorney, Agent, or Firm* — Cantor Colburn LLP

(57) ABSTRACT

A method, apparatus, storage medium, and terminal for establishing a Wi-Fi connection is provided. The method includes the following steps: when a workstation is detected, determining a Bluetooth binding relationship with the workstation; if the Bluetooth binding relationship indicates that a binding has already been established with the workstation via Bluetooth, sending a session request to the workstation to request to start a session; when it is determined that the session is started successfully, requesting Wi-Fi connection parameter information from the workstation via Bluetooth; and after the Wi-Fi connection parameter information is received, using the Wi-Fi connection parameter information to establish a Wi-Fi connection with the workstation.

19 Claims, 6 Drawing Sheets

(51) Int. Cl.
*H04W 76/10* (2018.01)
*H04W 8/24* (2009.01)

(56) References Cited

U.S. PATENT DOCUMENTS

| | | | | |
|---|---|---|---|---|
| 2014/0302842 | A1* | 10/2014 | Lloyd | H04L 41/0806 |
| | | | | 455/426.1 |
| 2015/0038073 | A1* | 2/2015 | Vang | H04W 76/10 |
| | | | | 455/41.1 |
| 2015/0181370 | A1* | 6/2015 | French | H04W 8/005 |
| | | | | 455/456.6 |
| 2015/0296329 | A1* | 10/2015 | Mao | H04W 8/005 |
| | | | | 370/338 |
| 2016/0164725 | A1 | 6/2016 | Wu et al. | |
| 2016/0269103 | A1* | 9/2016 | Lu | H04W 12/06 |
| 2016/0278739 | A1 | 9/2016 | Pelissier et al. | |
| 2016/0285843 | A1* | 9/2016 | Popovich | H04L 63/102 |
| 2017/0111936 | A1* | 4/2017 | Vanover | H04W 76/10 |
| 2017/0202034 | A1 | 7/2017 | Paxinos et al. | |
| 2018/0049257 | A1* | 2/2018 | Liu | H04B 5/02 |
| 2018/0255419 | A1* | 9/2018 | Canavor | H04L 63/083 |
| 2019/0052476 | A1* | 2/2019 | Shu | H04W 12/003 |
| 2019/0273737 | A1* | 9/2019 | Cai | H04L 63/0876 |
| 2019/0353985 | A1* | 11/2019 | Austin | A01K 97/125 |
| 2020/0007339 | A1* | 1/2020 | Li | H04L 9/3247 |
| 2020/0412719 | A1* | 12/2020 | Lee | H04L 41/0873 |

FOREIGN PATENT DOCUMENTS

| | | |
|---|---|---|
| CN | 106209142 A | 12/2016 |
| WO | WO 2016/127138 A1 | 8/2016 |
| WO | WO-2017185339 A1 * | 11/2017 ............ H04W 76/10 |

OTHER PUBLICATIONS

SIPO First Office Action for corresponding CN201710611466.9 dated May 21, 2019.

* cited by examiner

METHOD, APPARATUS, STORAGE MEDIUM, AND TERMINAL FOR ESTABLISHING A WI-FI CONNECTION

CROSS-REFERENCE TO RELATED APPLICATION

This application is based upon and claims priority from Chinese Patent Application No. 201710611466.9, filed on Jul. 25, 2017, the disclosure of which is expressly incorporated herein by reference in its entirety.

TECHNICAL FIELD

The present disclosure relates to the field of communication technology and specifically relates to a method, apparatus, storage medium, and terminal for establishing a Wi-Fi connection.

BACKGROUND

In currently available Wireless Fidelity (Wi-Fi) technology, in order to connect a terminal (also called a "station," STA) to a workstation (also called an "access point," AP), a user needs to obtain Wi-Fi connection parameter information of the workstation and input it into the terminal to realize the connection. The Wi-Fi connection parameter information may include a service set identifier (SSID) and a password (PSW). Herein, the SSID is also called a Wi-Fi account number.

However, with the currently available technology, the user needs to obtain the Wi-Fi connection parameter information through human senses (for example, through inquiry or reading), and the Wi-Fi connection parameter information may easily be discovered, thus compromising security.

Furthermore, with the currently available technology, the Wi-Fi connection parameter information needs to be manually inputted into the terminal by the user after the user obtains the Wi-Fi connection parameter information, which is not convenient. Although some terminal devices are equipped with a hard-coded function, which allows storing the Wi-Fi connection parameter information after the user inputs the Wi-Fi connection parameter information for the first time in order to realize an input-free connection in subsequent connection processes, the user still needs to manually input said Wi-Fi connection parameter information once it is changed. This reduces the user's experience.

SUMMARY

In accordance with an embodiment of the present disclosure, there is provided a method for establishing a Wi-Fi connection, which includes: when a workstation is detected, determining a Bluetooth binding relationship with the workstation; if the Bluetooth binding relationship indicates that a binding has already been established with the workstation via Bluetooth, sending a session request to the workstation to request to start a session; when it is determined that the session is started successfully, requesting Wi-Fi connection parameter information from the workstation via Bluetooth; and after receiving the Wi-Fi connection parameter information, using the Wi-Fi connection parameter information to establish a Wi-Fi connection with the workstation.

Also in accordance with the present disclosure, there is provided an apparatus for establishing a Wi-Fi connection, which includes: a binding relationship determination module to determine a Bluetooth binding relationship with the workstation when the workstation is detected; a session request sending module to send a session request to the workstation to request to start a session when the Bluetooth binding relationship indicates that a binding has already been established with the workstation via Bluetooth; an information request module to request Wi-Fi connection parameter information from the workstation via Bluetooth when it is determined that the session is started successfully; and a connection module to use the Wi-Fi connection parameter information to establish a Wi-Fi connection with the workstation after receiving the Wi-Fi connection parameter information.

Further in accordance with the present disclosure, there is provided a computer-readable storage medium in which computer instructions are stored, and the steps of the aforementioned method for establishing a Wi-Fi connection are executed when the computer instructions are executed.

Additionally, in accordance with the present disclosure, there is provided a terminal, which includes a memory and a processor. The memory stores computer instructions that can be executed by the processor, and the steps of the aforementioned method for establishing a Wi-Fi connection are performed when the processor executes the computer instructions.

Furthermore, in accordance with the present disclosure, there is provided a non-transitory computer-readable storage medium storing computer instructions. The computer instructions are executed by a processor of a terminal to cause the terminal to: when a workstation is detected, determine a Bluetooth binding relationship with the workstation; if the Bluetooth binding relationship indicates that a binding has already been established with the workstation via Bluetooth, send a session request to the workstation to request to start a session; when it is determined that the session is started successfully, request Wi-Fi connection parameter information form the workstation via Bluetooth; and after the Wi-Fi connection parameter information is received, use the Wi-Fi connection parameter information to establish a Wi-Fi connection with the workstation.

DETAILED DESCRIPTION

To connect a terminal to a workstation with currently available Wi-Fi technology, a user needs to obtain Wi-Fi connection parameter information through human senses and input the information into the terminal in order to realize the connection. The Wi-Fi connection parameter information may be easily discovered, thus compromising security. And, the Wi-Fi connection parameter information needs to be manually inputted into the terminal by the user, which is not convenient.

Through research, the inventors of the present disclosure have discovered that in the currently available technology, the Wi-Fi connection parameter information is both obtained and inputted with a human user as the transmission medium. Since such information is visible to the user, it is difficult to ensure the security of the information.

In one embodiment of the present disclosure, when a workstation is detected, a Bluetooth binding relationship with the workstation is determined. If the Bluetooth binding relationship indicates that a binding has already been established with the workstation via Bluetooth, a session request is sent to the workstation to request to start a session. When it is determined that the session is started successfully, Wi-Fi connection parameter information is requested from the workstation via Bluetooth. After Wi-Fi connection parameter information is received, the Wi-Fi connection parameter information is used to establish a Wi-Fi connection with the workstation. With the solution described above, a session can be started and Wi-Fi connection parameter information can be transmitted via Bluetooth when a workstation and a terminal are bound using Bluetooth technology. As compared to the currently available technology, which requires a user to obtain Wi-Fi connection parameter information through human senses and manually input it into the terminal, Wi-Fi connection parameter information is transmitted in a way that is invisible to the user in the solution described in the present disclosure, which effectively enhances the security of Wi-Fi connection parameter information, increases operational convenience for the user, and thus helps improve user experience.

In order to make the aforementioned purpose, characteristics, and benefits of the present disclosure more evident and easier to understand, detailed descriptions of embodiments of the present disclosure, with reference to the attached drawings, are provided.

Figure 1:
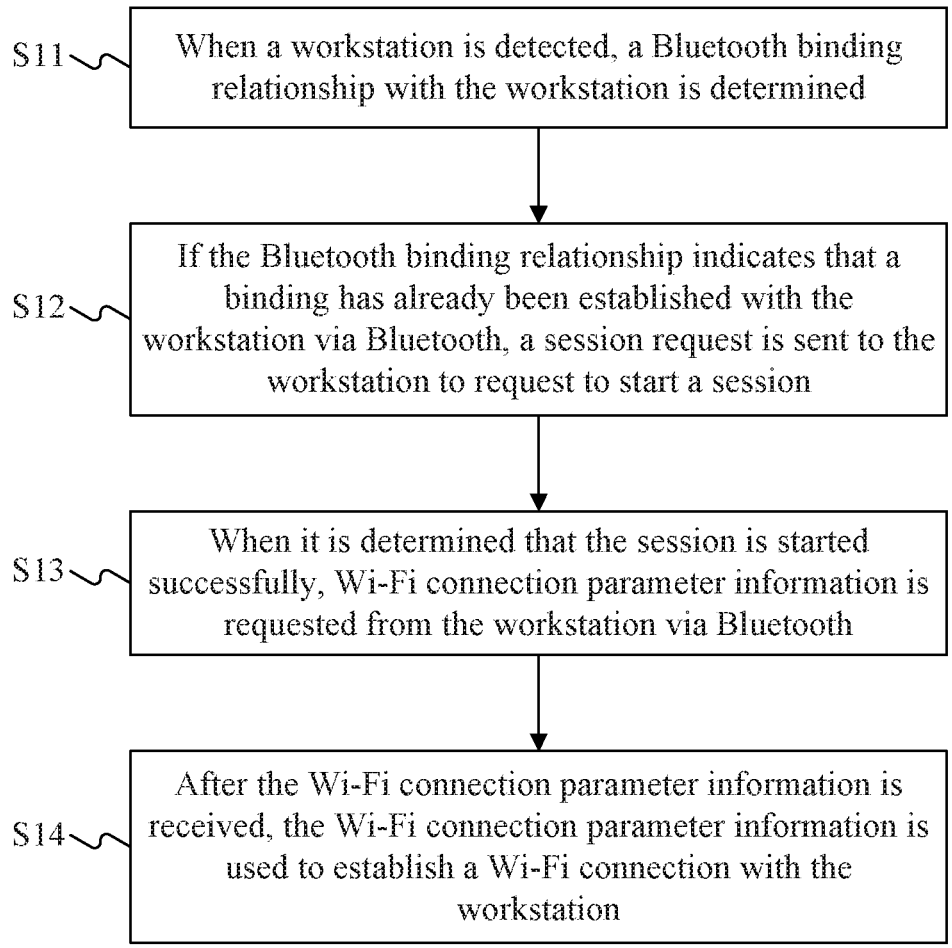
FIG. 1 is a flowchart illustrating a method for establishing a Wi-Fi connection in an embodiment of the present disclosure.

FIG. 1 is a flowchart illustrating a method for establishing a Wi-Fi connection in an embodiment of the present disclosure. The method for establishing a Wi-Fi connection includes Steps S11 through S14:

Step S11: When a workstation is detected, a Bluetooth binding relationship with the workstation is determined.

Step S12: If the Bluetooth binding relationship indicates that a binding has already been established with the workstation via Bluetooth, a session request is sent to the workstation to request to start a session.

Step S13: When it is determined that the session is started successfully, Wi-Fi connection parameter information is requested from the workstation via Bluetooth.

Step S14: After the Wi-Fi connection parameter information is received, the Wi-Fi connection parameter information is used to establish a Wi-Fi connection with the workstation.

In one embodiment of Step S11, when a terminal detects a workstation, a determination is made whether a Bluetooth binding relationship has been established with the workstation.

Specifically, both the terminal and workstation that have been bound via Bluetooth store binding information generated based on the binding relationship, which allows the terminal and workstation to reconnect without performing binding again. In one embodiment, whether the terminal and workstation have been bound via Bluetooth can be determined based on the binding information, or it can be determined by other conventional means.

In one embodiment of Step S12, if the terminal is already bound with the workstation via Bluetooth, a session request is sent to the workstation to request to start a session.

Furthermore, before the session request is sent to the workstation to request to start a session, the method further includes: if the Bluetooth binding relationship indicates that no binding has been established with the workstation via Bluetooth, an operation to bind with the workstation is performed via Bluetooth.

In one embodiment of Step S13, the following approach can be used to determine that the session is successfully started: when an instruction that agrees to start a session is received from the workstation, it is determined that the session is successfully started, and the instruction that agrees to start a session is sent after the workstation verifies and approves the binding information.

Furthermore, when determining that the session is started successfully, the terminal requests Wi-Fi connection parameter information from the workstation via Bluetooth.

Here, the Wi-Fi connection parameter information may include an SSID and a PSW.

In one embodiment of Step S14, the Wi-Fi connection parameter information is used to establish a Wi-Fi connection with the workstation after the terminal receives the Wi-Fi connection parameter information from the workstation via Bluetooth.

In one embodiment, a session can be started and Wi-Fi connection parameter information can be transmitted via Bluetooth when a workstation and a terminal are bound using Bluetooth technology. As compared to the currently available technology, which requires the user to obtain Wi-Fi connection parameter information through human senses and manually input it into the terminal, Wi-Fi connection parameter information is transmitted in a way that is invisible to the user in the solution described in the present disclosure, which effectively enhances the security of Wi-Fi connection parameter information, increases operational convenience for the user, and thus helps improve user experience.

Figure 2:
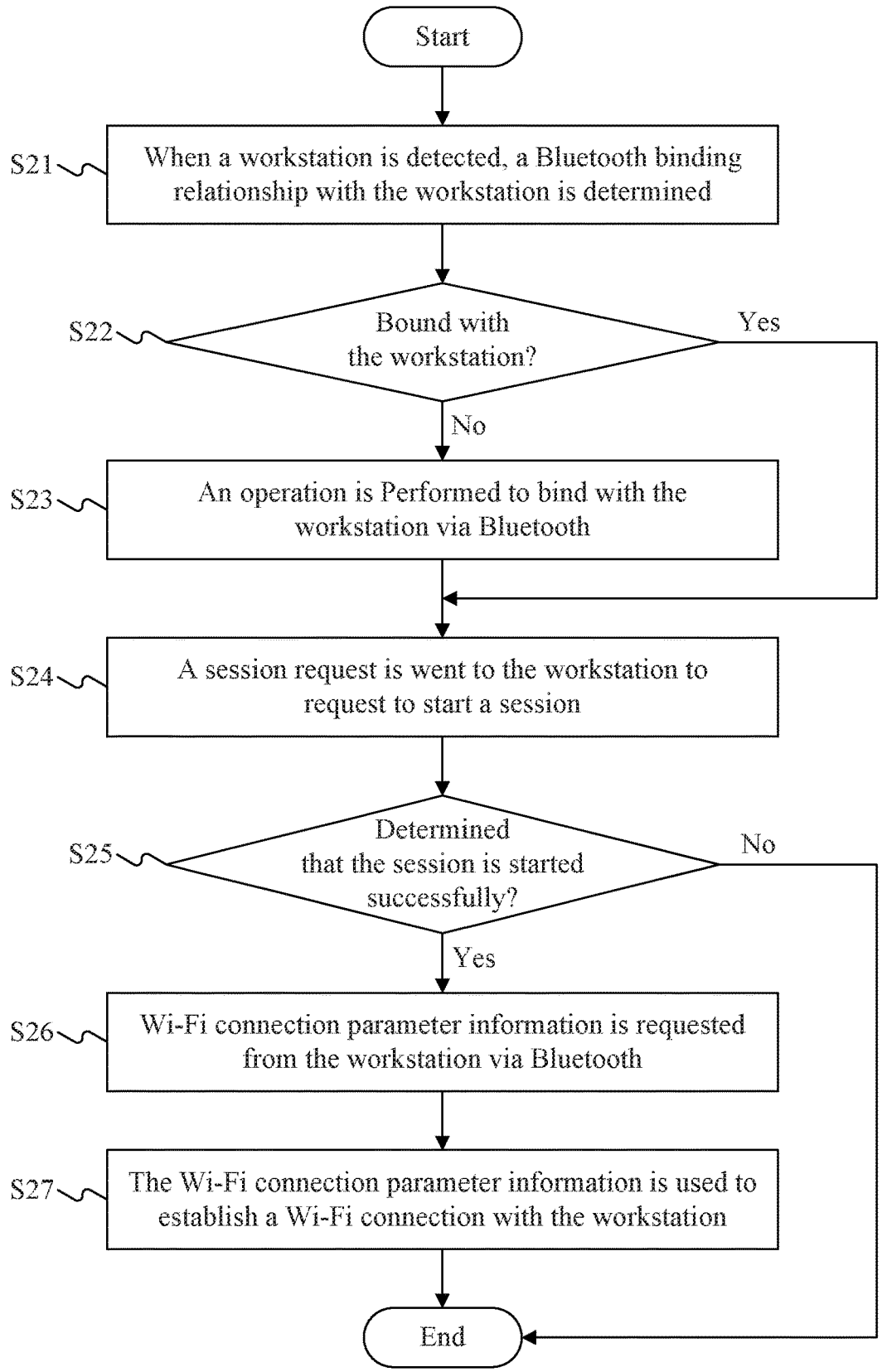
FIG. 2 is a flowchart illustrating a second method for establishing a Wi-Fi connection in an embodiment of the present disclosure.

FIG. 2 is a flowchart illustrating a second method for establishing a Wi-Fi connection in an embodiment of the present disclosure. The method for establishing a Wi-Fi connection includes Steps S21 through S27:

In Step S21: When a workstation is detected, a Bluetooth binding relationship with the workstation is determined.

Step 21 is substantially the same as Step S11. Accordingly, reference to the detailed description of Step S11 should be made for a description of Step S21.

In Step S22, a judgment is made as to whether a bonding has been established with said workstation; when the judgment result is "yes," Step S24 is executed; otherwise, Step S23 is executed.

In Step S23, an operation is performed to bind with the workstation via Bluetooth.

Figure 3:
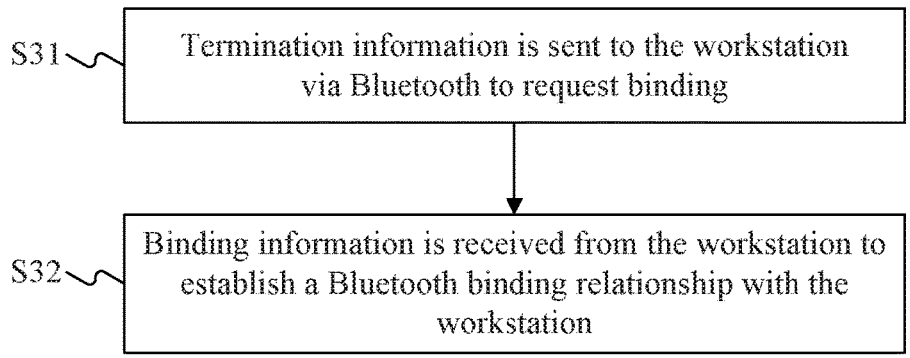
FIG. 3 is a flowchart illustrating an embodiment of Step S23 in FIG. 2.

FIG. 3 is a flowchart illustrating an embodiment of Step S23, i.e., the step of performing the binding operation with the workstation via Bluetooth, and includes Steps S31 and S32:

Step S31: Terminal information is sent to the workstation via Bluetooth to request binding.

Step S32: Binding information is received from the workstation to establish a Bluetooth binding relationship with the workstation.

In one embodiment of Step S31, the terminal information is used by the workstation to make a determination about the terminal. For example, the terminal information can be an international mobile subscriber identity (IMSI) of the terminal, an international mobile subscriber identity (IMSI) and device number of the terminal, etc.

In one embodiment of Step S32, the binding information may be information generated by the workstation based on the received terminal information.

Here, the binding information may include token information.

In an embodiment of the present disclosure, the binding information may further include an operation-type token. For example, "AA" or another string is used to represent the operation of establishing a Wi-Fi connection, and the operation-type token is added before or after the token information to indicate that the binding information is for establishing a Wi-Fi connection between the terminal and workstation.

Furthermore, the terminal may read and store the binding information to establish the binding relationship with the workstation.

Figure 4:
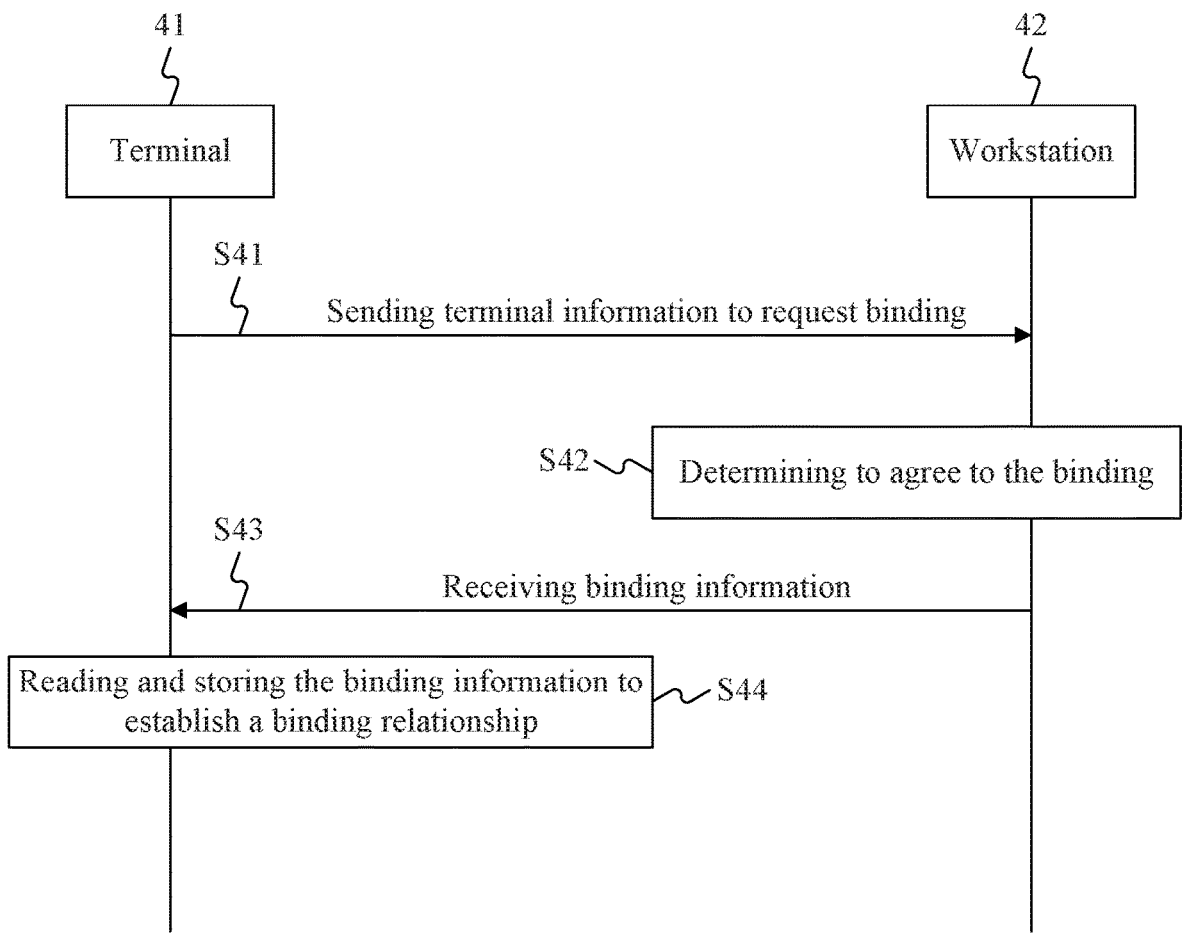
FIG. 4 is a data flowchart illustrating another embodiment of Step S23 in FIG. 2.

FIG. 4 is a data flowchart illustrating another embodiment of Step S23, i.e. the step of performing the binding operation with the workstation via Bluetooth, and includes Steps S41 through S44:

Step S41: A terminal 41 sends terminal information to a workstation 42 to request binding.

Step S42: The workstation 42 determines to agree to the binding.

Step S43: The terminal 41 receives binding information from the workstation 42.

Step S44: The terminal 41 reads and stores the binding information to establish a binding relationship.

For further detailed description of Steps S41 through S44, please refer to the description of Steps S31 and S32 in FIG. 3. No redundant descriptions will be detailed here.

Continuing in reference to FIG. 2, in Step S24, a session request is sent to the workstation to request to start a session.

Specifically, the session request may include the binding information so that the workstation can compare the binding information in the session request and the stored binding information, and the workstation can agree to establish the session requested when the binding information from the two sources matches.

In another embodiment, the session request may further include an operation-type token. For example, "AA" or another string is used to represent the operation of establishing a Wi-Fi connection, and the operation-type token is added before or after the token information to indicate that the session request is for establishing a Wi-Fi connection between the terminal and workstation.

In Step S25, it is determined whether the session is started successfully. When the result of the determination is "yes," Step S26 is executed.

In one embodiment, the determination of the successful start of the session may be made when the instruction that agrees to start a session is received from the workstation. For further detailed description, please refer to the description of Step S13 in FIG. 1. No redundant descriptions will be detailed here.

In Step S26, Wi-Fi connection parameter information is requested from the workstation via Bluetooth.

Specifically, in the Wi-Fi connection parameter information, the SSID and PSW may be an encrypted SSID and/or an encrypted PSW. The encryption method may be a conventional encryption method. In embodiments of the present disclosure, there is no restriction on the specific encryption method used.

In one embodiment, the encryption of the SSID and/or PSW through the workstation effectively reduces the possibility of information leakage and enhances the security of the SSID and/or PSW.

Preferably, the Wi-Fi connection parameter information may be encrypted based on the binding information. For example, a token is used as the key to encrypt the Wi-Fi connection parameter information. In one embodiment, encryption based on the binding information helps make a more accurate determination of whether the transmitter end and receiver end are correct through the binding information when the terminal receives the Wi-Fi connection parameter information.

It should be noted that the step that requests Wi-Fi connection parameter information may be triggered when it is confirmed that the session is successfully started. As compared to the currently available technology, which requires the user to obtain Wi-Fi connection parameter information through human senses, Wi-Fi connection parameter information is requested in a way that is invisible to the user in the solution described in the embodiments of the present disclosure, which effectively increases operational convenience for the user.

In Step S27, the Wi-Fi connection parameter information is used to establish a Wi-Fi connection with the workstation.

Furthermore, when the SSID and PSW are an encrypted SSID and/or an encrypted PSW, using the Wi-Fi connection parameter information to establish a Wi-Fi connection with the workstation may include: decrypting the encrypted SSID and/or encrypted PSW; and establishing a Wi-Fi connection with the workstation based on the decrypted SSID and PSW.

For more detailed descriptions of Steps S21 through S27 in the embodiments, please refer to the descriptions of Steps S11 through S14 in FIG. 1. No redundant descriptions will be detailed here.

Furthermore, after a Wi-Fi connection is established with the workstation, a Wi-Fi communication instruction that interacts with the workstation may be encrypted through the binding information, which effectively enhances the security of the Wi-Fi communication.

Figure 5:
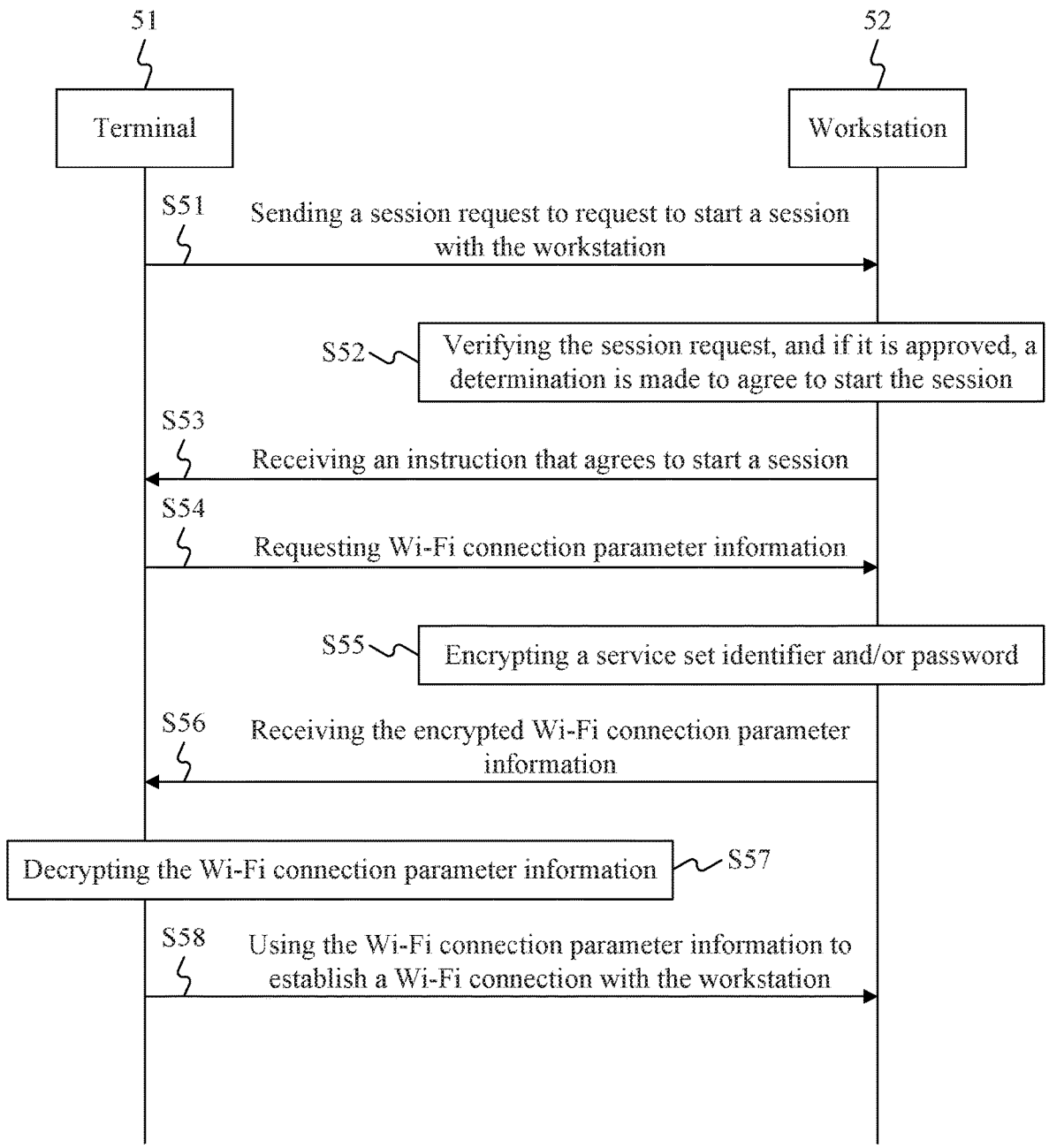
FIG. 5 is a data flowchart that corresponds to some steps in a third method for establishing a Wi-Fi connection in an embodiment of the present disclosure.

FIG. 5 is a data flowchart that corresponds to some of the steps in a third method for establishing a Wi-Fi connection in an embodiment of the present disclosure. The third method for establishing a Wi-Fi connection includes Steps S21 through S24 shown in FIG. 2, and further includes Steps S51 through S58, descriptions of each of which are provided below.

In Step S51, a terminal 51 sends a session request to a workstation 52 to request to start a session with the workstation 52.

In Step S52, the workstation 52 verifies the session request, and if it is approved, a determination is made to agree to start the session.

In Step S53, the terminal 51 receives from the workstation 52 an instruction that agrees to start a session.

In Step S54, the terminal 51 requests from the workstation 52 Wi-Fi connection parameter information.

In Step S55, the workstation 52 encrypts a service set identifier and/or password.

In Step S56, the terminal 51 receives from the workstation 52 the encrypted Wi-Fi connection parameter information.

In Step S57, the terminal 51 decrypts the Wi-Fi connection parameter information.

In Step S58, the terminal 51 uses the Wi-Fi connection parameter information to establish a Wi-Fi connection with the workstation 52.

For more detailed descriptions of Steps S51 through S58 in the embodiments, please refer to the descriptions in the previous text and FIGS. 1 through 4. No redundant descriptions will be detailed here.

Figure 6:
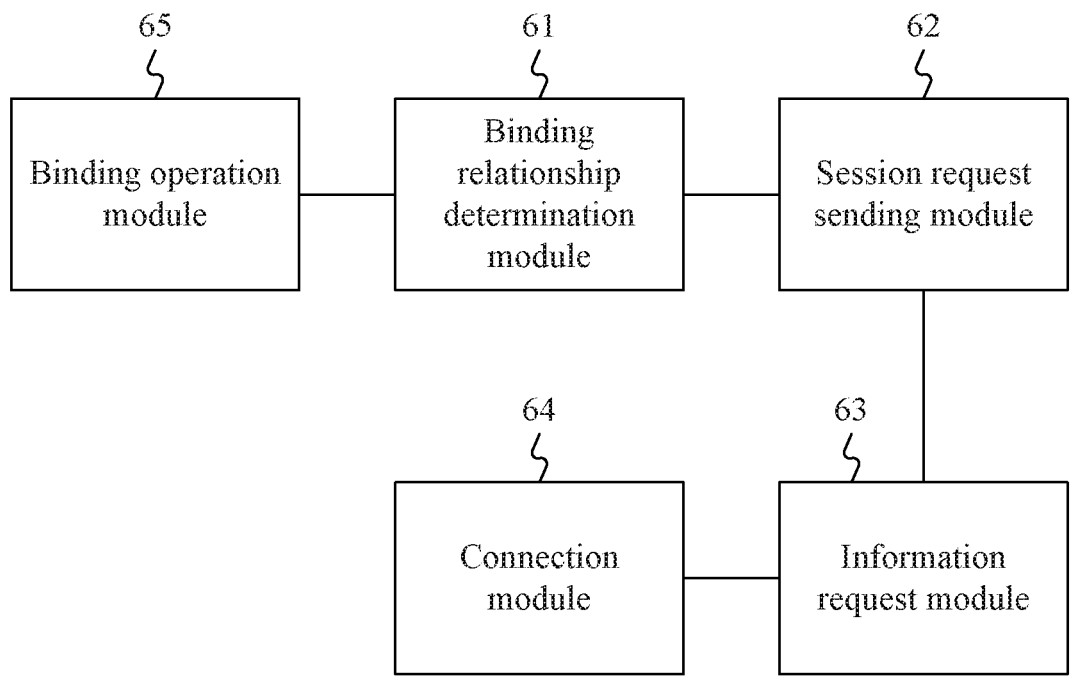
FIG. 6 is a structural schematic diagram illustrating an apparatus for establishing a Wi-Fi connection in an embodiment of the present disclosure.

FIG. 6 is a structural schematic diagram illustrating an apparatus for establishing a Wi-Fi connection in one embodiment of the present disclosure. The apparatus for establishing a Wi-Fi connection includes a binding relationship determination module 61, a session request sending module 62, an information request module 63, a connection module 64, and a binding operation module 65.

The binding relationship determination module 61 is configured for determining the Bluetooth binding relationship with a workstation when the workstation is detected.

The session request sending module 62 is configured for sending a session request to the workstation to request to start a session when the Bluetooth binding relationship indicates that a binding has already been established with the workstation via Bluetooth.

The information request module 63 is configured for requesting Wi-Fi connection parameter information from the workstation via Bluetooth when it is determined that the session is started successfully.

The connection module 64 is configured for using the Wi-Fi connection parameter information to establish a Wi-Fi connection with the workstation after the Wi-Fi connection parameter information is received.

The binding operation module 65 is configured for performing an operation to bind with the workstation via Bluetooth when the Bluetooth binding relationship indicates that no binding has been established with the workstation via Bluetooth and before the session request sending module sends the session request to the workstation to request to start a session.

Figure 7:
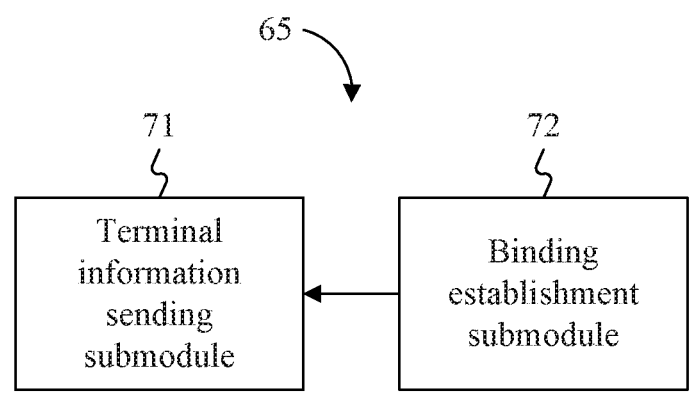
FIG. 7 is a structural schematic diagram illustrating an embodiment of the binding operation module in FIG. 6.

Furthermore, FIG. 7 is a structural schematic diagram illustrating an embodiment of the binding operation module 65 in FIG. 6. The binding operation module 65 includes a terminal information sending submodule 71 and a binding establishment submodule 72.

The terminal information sending submodule 71 is configured for sending terminal information to the workstation via Bluetooth to request binding.

The binding establishment submodule 72 is configured for receiving binding information from the workstation to establish a Bluetooth binding relationship with the workstation.

Furthermore, the session request may include the binding information.

The binding information may include token information.

The Wi-Fi connection parameter information may be encrypted based on the binding information.

The apparatus for establishing a Wi-Fi connection may further include: after a Wi-Fi connection is established with the workstation through the connection module, encrypting the Wi-Fi communication instruction that interacts with the workstation through the binding information.

Furthermore, the following approach can be used to determine that the session is successfully started: when an instruction that agrees to start a session is received from the workstation, it is determined that the session is successfully started, and the instruction that agrees to start a session is sent after the workstation verifies and approves the binding information.

The Wi-Fi connection parameter information may include a service set identifier and a password.

The service set identifier and password may be an encrypted service set identifier and/or an encrypted password.

Figure 8:
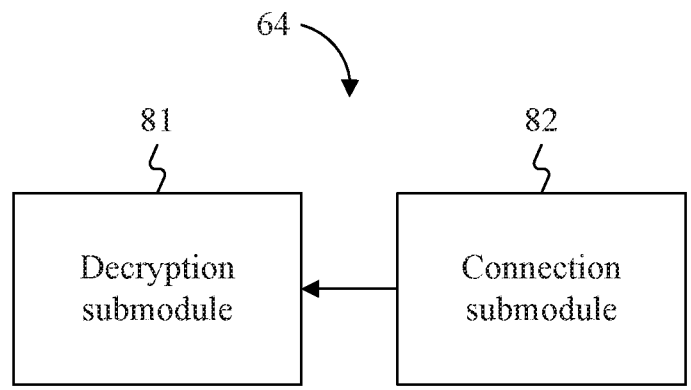
FIG. 8 is a structural schematic diagram illustrating an embodiment of a connection module in FIG. 6.

FIG. 8 is a structural schematic diagram illustrating an embodiment of the connection module 64 in FIG. 6. The connection module 64 includes a decryption submodule 81 and a connection submodule 82.

The decryption submodule 81 is configured for decrypting the encrypted service set identifier and/or encrypted password.

The connection submodule 82 is configured for establishing a Wi-Fi connection with the workstation based on the decrypted service set identifier and password.

For more detail about the principle, implementation, and advantages of the apparatus for establishing a Wi-Fi connection, please refer to the relevant description of the method for establishing a Wi-Fi connection in the previous text and FIGS. 1 through 5. No redundant descriptions will be detailed here.

One embodiment of the present disclosure further provides a computer-readable storage medium in which computer instructions are stored, and the steps in the aforementioned method for establishing a Wi-Fi connection are executed when the computer instructions are executed. The computer-readable storage medium maybe a compact disk, a hard disk drive, or a solid-state drive.

Figure 9:
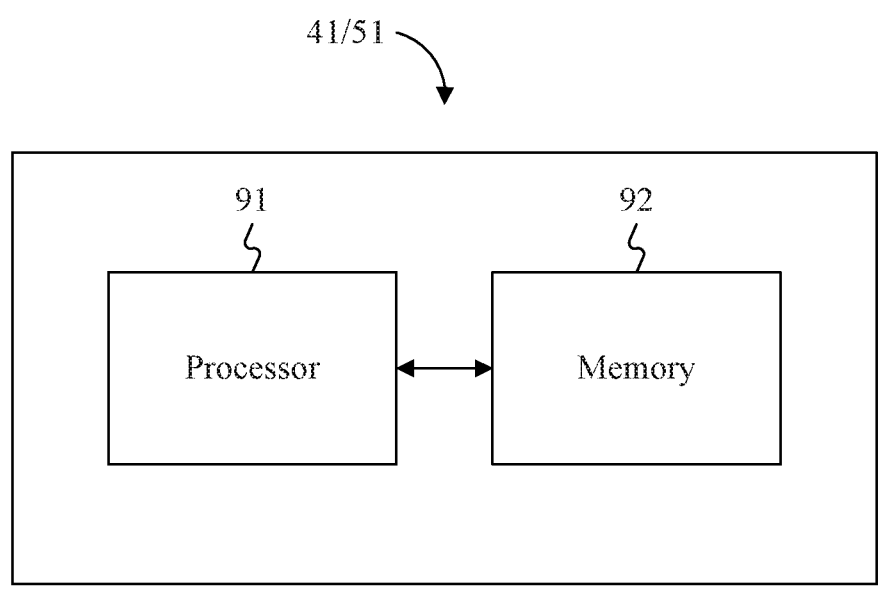
FIG. 9 is a structural schematic diagram illustrating a terminal in accordance with an embodiment of the present disclosure.

One embodiment of the present disclosure further provides a terminal, such as terminal 41 or 51, which includes a memory 92 and a processor 91 as shown in FIG. 9. The memory 92 stores computer instructions that can be executed on the processor 91, and the steps in the aforementioned method for establishing a Wi-Fi connection are executed when the processor 91 executes the computer instructions.

Specifically, the terminal may be a smartphone, a tablet, or another terminal device.

The description of embodiments herein does not restrict the present invention. Any person of skill in the art may make various alterations and changes that are within the spirit and scope of the present invention; therefore, the scope of protection for the present invention should be that as defined by the claims.

The invention claimed is:

1. A method for establishing a Wi-Fi connection, comprising:
    when a workstation is detected, determining a Bluetooth binding relationship with the workstation;
    if the Bluetooth binding relationship indicates that no binding has been established with the workstation via Bluetooth, sending terminal information to the workstation via Bluetooth to request binding, and receiving binding information from the workstation to establish the Bluetooth binding relationship with the workstation, wherein the binding information comprises token information;
    if the Bluetooth binding relationship indicates that a binding has already been established with the workstation via Bluetooth, sending a session request to the workstation to request to start a session;
    when it is determined that the session is started successfully, requesting Wi-Fi connection parameter information from the workstation via Bluetooth; and after the Wi-Fi connection parameter information is received, using the Wi-Fi connection parameter information to establish a Wi-Fi connection with the workstation.

2. The method according to claim 1, wherein the session request comprises the binding information.

3. The method according to claim 1, wherein the Wi-Fi connection parameter information is encrypted based on the binding information.

4. The method according to claim 1, further comprising:
after a Wi-Fi connection is established with the workstation, encrypting the Wi-Fi communication instruction that interacts with said workstation is encrypted through the binding information.

5. The method according to claim 1, wherein the determination that the session is successfully started comprises:
when an instruction that agrees to start a session is received from the workstation, determining that the session is successfully started, the instruction that agrees to start a session being sent after the workstation verifies and approves the binding information.

6. The method according to claim 1, wherein the Wi-Fi connection parameter information comprises a service set identifier and a password.

7. The method according to claim 6, wherein the service set identifier and password comprise an encrypted service set identifier and/or an encrypted password.

8. The method according to claim 7, wherein the establishment of a Wi-Fi connection with the workstation using the Wi-Fi connection parameter information comprises:
decrypting the encrypted service set identifier and/or encrypted password; and
establishing a Wi-Fi connection with the workstation based on the decrypted service set identifier and password.

9. An apparatus for establishing a Wi-Fi connection, comprising:
a binding relationship determination circuit to determine a Bluetooth binding relationship with a workstation when the workstation is detected;
a binding operation circuit to perform an operation to bind with the workstation via Bluetooth when the Bluetooth binding relationship indicates that no binding has been established with the workstation via Bluetooth;
a session request sending circuit to send a session request to the workstation to request to start a session when the Bluetooth binding relationship indicates that a binding has already been established with the workstation via Bluetooth;
an information request circuit to request Wi-Fi connection parameter information from the workstation via Bluetooth when it is determined that the session is started successfully; and
a connection circuit to use the Wi-Fi connection parameter information to establish a Wi-Fi connection with the workstation after the Wi-Fi connection parameter information is received,
wherein the binding operation circuit comprises:
a terminal information sending sub-circuit to send the terminal information to the workstation via Bluetooth to request binding; and
a binding establishment sub-circuit to receive binding information from the workstation to establish a Bluetooth binding relationship with the workstation, wherein the binding information comprises token information.

10. The apparatus according to claim 9, wherein the session request comprises the binding information.

11. The apparatus according to claim 9, wherein the Wi-Fi connection parameter information is encrypted based on the binding information.

12. The apparatus according to claim 9, wherein,
after a Wi-Fi connection is established with the workstation through the connection circuit, the Wi-Fi communication instruction that interacts with the workstation is encrypted through the binding information.

13. The apparatus according to claim 9, wherein, in the determination that the session is successfully started,
when an instruction that agrees to start a session is received from the workstation, it is determined that the session is successfully started, and the instruction that agrees to start a session is sent after the workstation verifies and approves the binding information.

14. The apparatus according to claim 9, wherein the Wi-Fi connection parameter information comprises a service set identifier and a password.

15. The apparatus according to claim 14, wherein the service set identifier and password comprise an encrypted service set identifier and/or an encrypted password.

16. The apparatus according to claim 15, wherein the connection circuit comprises:
a decryption sub-circuit to decrypt the encrypted service set identifier and/or encrypted password; and
a connection sub-circuit to establish a Wi-Fi connection with the workstation based on the decrypted service set identifier and password.

17. A non-transitory computer-readable storage medium in which computer instructions are stored, wherein the steps in the method for establishing a Wi-Fi connection according to claim 1 are executed when the computer instructions are executed.

18. A terminal, which comprises a memory and a processor, the memory storing computer instructions that can be run on the processor, wherein the steps in the method for establishing a Wi-Fi connection according to claim 1 are executed when the processor executes the computer instructions.

19. A non-transitory computer-readable storage medium storing computer instructions, the computer instructions, when executed by a processor of a terminal, causing the terminal to:
when a workstation is detected, determine a Bluetooth binding relationship with the workstation;
if the Bluetooth binding relationship indicates that no binding has been established with the workstation via Bluetooth, send terminal information to the workstation via Bluetooth to request binding, and receive binding information from the workstation to establish the Bluetooth binding relationship with the workstation, wherein the binding information comprises token information;
if the Bluetooth binding relationship indicates that a binding has already been established with the workstation via Bluetooth, send a session request to the workstation to request to start a session;
when it is determined that the session is started successfully, request Wi-Fi connection parameter information from the workstation via Bluetooth; and
after the Wi-Fi connection parameter information is received, use the Wi-Fi connection parameter information to establish a Wi-Fi connection with the workstation.

* * * * *